(12) United States Patent
Douglas et al.

(10) Patent No.: US 10,733,646 B2
(45) Date of Patent: Aug. 4, 2020

(54) SYSTEM AND METHOD FOR A KIOSK IN THE MOBILE OS

(71) Applicant: Capital One Services, LLC, McLean, VA (US)

(72) Inventors: Lawrence Douglas, McLean, VA (US); Thomas S. Poole, Chantilly, VA (US); Hannes Jouhikainen, Arlington, VA (US)

(73) Assignee: CAPITAL ONE SERVICES, LLC, McLean, VA (US)

( * ) Notice: Subject to any disclaimer, the term of this patent is extended or adjusted under 35 U.S.C. 154(b) by 725 days.

(21) Appl. No.: 15/356,801

(22) Filed: Nov. 21, 2016

(65) Prior Publication Data
US 2017/0148074 A1 May 25, 2017

Related U.S. Application Data

(60) Provisional application No. 62/257,787, filed on Nov. 20, 2015.

(51) Int. Cl.
*G06Q 30/00* (2012.01)
*G06Q 30/06* (2012.01)

(52) U.S. Cl.
CPC ..... *G06Q 30/0617* (2013.01); *G06Q 30/0609* (2013.01)

(58) Field of Classification Search
CPC .................................. G06Q 30/06–08
USPC ................................ 705/26.1–27.2
See application file for complete search history.

(56) References Cited

U.S. PATENT DOCUMENTS

2014/0324638 A1* 10/2014 Khalid .......... H04W 4/70
                                                 705/27.1
2016/0224774 A1* 8/2016 Pender .......... G06F 21/32

* cited by examiner

*Primary Examiner* — Ethan D Civan
(74) *Attorney, Agent, or Firm* — Troutman Sanders LLP; Christopher J. Forstner; John A. Morrissett

(57) ABSTRACT

A system and method include a kiosk processor, a device kiosk on a customer mobile device, which displays via a user interface, content and options for the customer from a third party customer service system, a customer interaction channel that receives, via an associated customer interaction network, a request to access the third party customer service system, via the device kiosk on a customer mobile device, an authentication module associated with the kiosk processor that receives customer data and customer input associated with an authentication request via a network to authenticate the customer, identifies a customer mobile device based on device identifiers, and evaluates risk factors associated with the customer mobile device, and a communication interface associated with the kiosk processor, that transmits, via a push notification gateway, a push notification to the device kiosk on the customer mobile device that establishes, via the network, a secure connection between the customer mobile device and the third party customer service system.

14 Claims, 5 Drawing Sheets

SYSTEM AND METHOD FOR A KIOSK IN THE MOBILE OS

CROSS-REFERENCE TO RELATED APPLICATIONS

This application contains subject matter related to and claims the benefit of U.S. Provisional Patent Application No. 62/257,787, filed on Nov. 20, 2015, the entire contents of which is incorporated herein by reference.

FIELD OF THE DISCLOSURE

The present disclosure relates to systems and methods for delivering customer service via a kiosk application. The systems and methods for delivering customer service use a customer mobile device as an open platform to deliver customer service via the kiosk application.

BACKGROUND OF THE DISCLOSURE

Current systems and methods for delivering customer service utilize Interactive Voice Response (IVR) systems and Automatic Call Distribution (ACD) systems to input and process a customer's response to a request when calling to a third party customer service. The IVR and ACD systems may provide caller ID authentication, and may route customers to the correct call center group to handle their issue. The current processes of identifying and authenticating a customer in a call center may include requesting sensitive data from the customer, such as an account number, a transaction card number, a social security number, a mother's maiden name, a password, and/or other personal data. A customer may be required to wait in a queue to speak with a customer service agent during periods of high call volumes. The customer service systems may also present all possible options to route a customer to a correct call center group before a customer is routed to the desired group.

Current systems for delivering customer service therefore are not only burdensome for customers but also time-consuming and costly for companies providing customer service to these customers.

These and other drawbacks exist.

BRIEF DESCRIPTION OF THE DRAWINGS

Various embodiments of the present disclosure, together with further objects and advantages, may best be understood by reference to the following description taken in conjunction with the accompanying drawings, in the several Figures of which like reference numerals identify like elements, and in which.

DETAILED DESCRIPTION OF THE EMBODIMENTS

The following description is intended to convey a thorough understanding of the embodiments described by providing a number of specific exemplary embodiments and details involving systems and methods for using a customer mobile device as an open platform to deliver third party customer service via a device kiosk. It should be appreciated, however, that the present disclosure is not limited to these specific embodiments and details, which are exemplary only. It is further understood that one possessing ordinary skill in the art, in light of known systems and methods, would appreciate the use of the invention for its intended purposes and benefits in any number of alternative embodiments, depending on specific design and other needs. A customer service center and system supporting a customer service center are used as examples for the disclosure. The disclosure is not intended to be limited to customer service centers only.

As described herein, a device kiosk may be an application or extension of an existing application that is preloaded on a mobile operating system. The device kiosk may have differentiated access to the mobile operating system via private APIs, and may be connected through a data connection to a server managed by the mobile network operator (MNO) or original equipment manager (OEM). Third party systems that wish to leverage the kiosk experience for their customers may integrate with a set of APIs made accessible to them that interacts with the server. The third party systems may make calls to the APIs using a token provided by the MNO/OEM. The set of APIs may provide a secure communication between a customer mobile device and a third party system.

The examples disclosed herein are directed to systems and methods for using a customer mobile device as an open platform to deliver third party customer service via a device kiosk. Though the example provided herein relates to delivering customer service via a device kiosk, one of skill in the art would appreciate that the digital authentication channel techniques described herein could be utilized in various customer interaction channels such as the various channels identified below.

Figure 1:
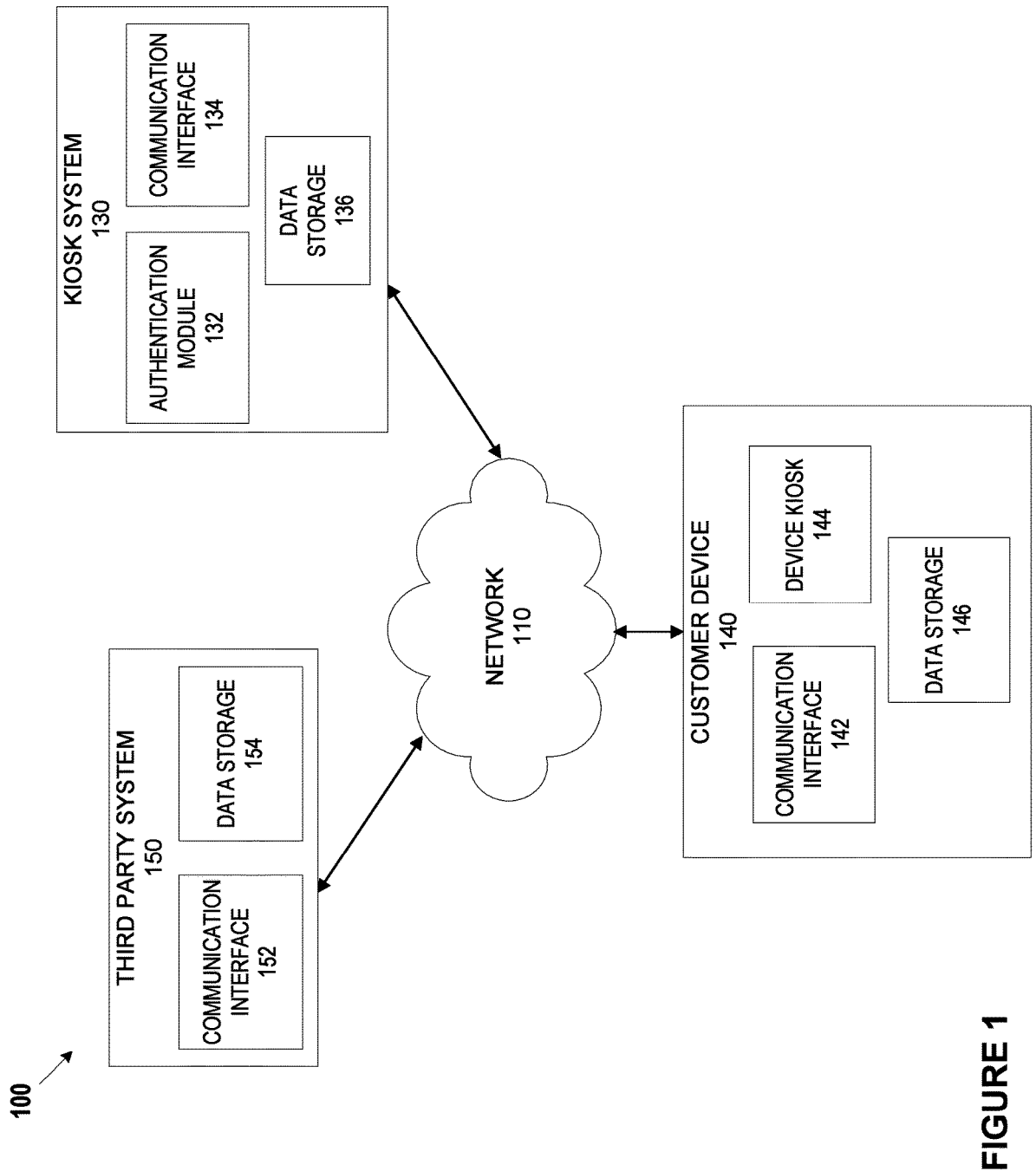
FIG. 1 depicts a schematic diagram of a system for using a customer mobile device as an open platform to deliver third party customer service via a device kiosk, according to an example embodiment of the disclosure.

FIG. 1 illustrates an example system for using a customer mobile device as an open platform to deliver third party customer service via a kiosk application. According to the various embodiments of the present disclosure, a system 100 for delivering third party customer service via a kiosk application may include a third party system 150, a kiosk system 130, and a customer device 140 connected over network 110. System 100 may utilize an open architecture that does not rely on an integration of the operating system of the customer mobile device and the third party system.

A third party system 150 may receive customer data from a customer interaction network associated with an incoming call or website generated request. A customer device 140 may receive an option to access the third party system 150, via a device kiosk 144 on the customer's device 140. A customer may transmit a response, and the third party system 150 may trigger a silent push notification, via a push notification gateway, to a kiosk processor. A response may include speech and/or input via a keypad or touchscreen. The push notification may include an embedded deep link in the payload to the third party service system 150.

The kiosk processor may determine authentication data based on the customer data and/or input, customer device data and risk factors associated with the customer device, and may utilize this authentication data to authenticate the customer, identify the customer device 140 and evaluate risk factors associated with the customer device 140. The kiosk processor may transmit, via a communication interface associated with the kiosk processor, the push notification to the customer device 140. When the push notification is received by the customer device 140, the device kiosk 144 on the customer device 140 may be opened, and a secure connection between the customer device 140 and the third party system 150 may be established, via the network 110.

The device kiosk 144 may use the transmitted deep link to make a call to the kiosk processor for data to present to the customer. The device kiosk 144 may display customer service system content and options from the third party system 150, via a user interface on the customer device 140. The customer may respond to the displayed customer service system content and options by entering data or making a selection. A response may include speech and/or input via a keypad or touchscreen. The device kiosk 144 may transmit the customer's responsive data to the kiosk processor, which may transmit the customer's response to the third party system 150. The third party system 150 may evaluate the customer's response to the displayed content and options, and may transmit responsive content and options based on the customer's response to the kiosk processor. The device kiosk 144 may display, via a user interface, the responsive third party system content and options.

The device kiosk 144 may access settings and features on the customer device 140 (e.g., text formatting (text size, font, format, bullets, numbered lists), contrast, language, screen reader for the blind or low image, and imagery to assist the illiterate, clarify branding, convey complicated topics or ease recognition of options) to display a user interface. The device kiosk 144 may display breadcrumb trails to provide the user with a navigation tool to see and to navigate the user's location within the flow of the third party system processing, via the user interface, and may provide the ability to deep link to the third party system's application or website for more information or online servicing options. The device kiosk 144 may access content stored on the customer device 140 (e.g., photos, camera, device identification information, security settings, information in the customer device's data storage 146).

The network 110 may be one or more of a wireless network, a wired network, or any combination of a wireless network and a wired network. For example, network 110 may include one or more of a fiber optics network, a passive optical network, a cable network, an Internet network, a satellite network, a wireless LAN, a Global System for Mobile Communication (GSM), a Personal Communication Service (PCS), a Personal Area Networks, (PAN), D-AMPS, Wi-Fi, Fixed Wireless Data, IEEE 802.11b, 802.15.1, 802.11n, and 802.11g or any other wired or wireless network for transmitting and receiving a data signal.

In addition, network 110 may include, without limitation, telephone lines, fiber optics, IEEE Ethernet 902.3, a wide area network (WAN), a local area network (LAN) or a global network such as the Internet. Also, network 110 may support an Internet network, a wireless communication network, a cellular network, or the like, or any combination thereof.

Network 110 may include one network, or any number of example types of networks mentioned above, operating as a stand-alone network or in cooperation with each other. Network 110 may utilize one or more protocols of one or more network elements to which they are communicatively couples. Network 110 may translate to or from other protocols to one or more protocols of network devices. Although network 110 is depicted as a single network, it should be appreciated that according to one or more embodiments, network 110 may comprise a plurality of interconnected networks, such as, for example, the Internet, a service provider's network, a cable television network, corporate networks, and home networks.

A kiosk system 130 may access network 110 through one or more kiosk processors that may be communicatively coupled to the network 110. One or more customers may access the network 110 through one or more customer devices 140 that also may be communicatively coupled to the network 110. A third party may access network 110 through one or more third party systems 150 that also may be communicatively coupled to network 110.

An example kiosk system 130, customer device 140 and/or third party system 150, may include one or more network-enabled computers to process instructions for delivering customer service via a kiosk application 300, 400. As referred to herein, a network-enabled computer may include, but is not limited to: e.g., any computer device, or communications device including, e.g., a server, a network appliance, a personal computer (PC), a workstation, a mobile device, a phone, a handheld PC, a personal digital assistant (PDA), a thin client, a fat client, an Internet browser, or other device. The one or more network-enabled computers of the example system 100 may execute one or more software applications for delivering third party customer service via a device kiosk.

An example kiosk system 130, customer device 140 and/or third party system 150 may include, for example, a processor, which may be several processors, a single processor, or a single device having multiple processors. A kiosk system 130, customer device 140 and/or third party system 150 may access and be communicatively coupled to the network 110. A kiosk system 130, customer device 140 and/or third party system 150 may store information in various electronic storage media, such as, for example, a database and/or other data storage (e.g., data storage 136, 146, 154). Electronic information may be stored in a kiosk system 130, customer device 140 and/or third party system 150 in a format such as, for example, a flat file, an indexed file, a hierarchical database, a post-relational database, a relational database, such as a database created and maintained with software from, for example Oracle® Corporation, Microsoft® Excel file, Microsoft® Access file, or any other storage mechanism.

An example kiosk system 130, customer device 140 and/or third party system 150 may send and receive data using one or more protocols. For example, data may be transmitted and received using Wireless Application Protocol (WAP), Multimedia Messaging Service (MMS), Enhanced Messaging Service (EMS), Short Message Service (SMS), Global System for Mobile Communications (GSM) based systems, Time Division Multiplexing (TDM) based systems, Code Division Multiples Access (CDMA) based systems suitable for transmitting and receiving data. Data may be transmitted and received wirelessly or may utilize cabled network connections or telecom connections, fiber connections, traditional phone wireline connection, a cable connection, or other wired network connection.

Each kiosk system 130, customer device 140 and/or third party system 150 of FIG. 1 also may be equipped with physical media, such as, but not limited to, a compact disc (CD), a digital versatile disc (DVD), a floppy disk, a hard drive, read only memory (ROM), random access memory (RAM), as well as other physical media capable of storing software, or combinations thereof. Kiosk system 130, customer device 140 and/or third party system 150 may be able to perform the functions associated with methods for delivering customer service via a device kiosk on a customer's mobile device 300, 400. Kiosk system 130, customer device 140 and/or third party system 150 may, for example, maintain the software for methods for digital authentication, obviating the need for a separate device on the network 110 to run the methods maintained in a kiosk system 130, customer device 140 and/or third party system 150.

Furthermore, the information stored in a database may be available over the network 110, with the network containing data storage. A database maintained in kiosk system 130, customer device 140 and/or third party system 150 or the network 110, may store, or may connect to external data warehouses that store, for example, customer account data, customer privacy data, and/or customer authentication data.

A kiosk system 130 may include authentication component 132 and/or data storage 136. A kiosk system 130 may include data and/or components, systems, and interfaces, including components application programming interfaces to enable the generation, transmission, and processing of digital authentication data. As used herein, the term "component" may be understood to refer to computer executable software, firmware, hardware, or various combinations thereof. It is noted that the components are exemplary. The components may be combined, integrated, separated, or duplicated to support various applications. Also, a function described herein as being performed at a particular component, system, or interface may be performed at one or more other components, systems, and interfaces and by one or more other devices instead of or in addition to the function performed at the particular component. Further, the components, systems, and interfaces may be implemented across multiple devices or other components local or remote to one another. Additionally, the components may be moved from one device and added to another device, or may be included in both devices.

Customer data may include for example, account number, customer name, date of birth, address, phone number(s), email address, payment data (e.g., financial account number used to make payments, financial institution address, phone number, website, and the like), transaction history, customer preferences, and the like. Customer preferences may include, for example, preferred method of contact, preferred method of transmitting authentication code, preferred travel destinations, airlines, hotel chains, car rental company, and the like, preferred time of day for a call or maintenance visit, preferred call center representative, preferred nickname, and other customer preferences. Customer privacy data may include, for example, customer social security number digits, mother's maiden name, account number, financial account data, a password, a PIN, customer privacy preferences, such as a method of transmission of a one-time authentication code (e.g., SMS, email, voicemail, and the like), biometric data, customer patterns and/or any other privacy data associated with the customer. Customer authentication data may include, for example, customer-specific authentication history (e.g., date and time of customer authentication, authentication attempt details, customer representative associated with authentication requests, and the like), customer service statistics (e.g., number of authentication-related issues per hour, number of authentication-related per representative, number of issues resolved, number of unresolved issues, and the like), customer authentication preferences (e.g., preferred method of transmitting an authentication code or notification, preferred method of authentication, and the like), and/or any authentication-related identifiers (e.g., customer service address, phone number(s), identification number, and the like).

An account may include, for example, a credit card account, a prepaid card account, stored value card account, debit card account, check card account, payroll card account, gift card account, prepaid credit card account, charge card account, checking account, rewards account, line of credit account, credit account, mobile device account, an account related to goods and/or services, or mobile commerce account. An account may or may not have an associated card, such as, for example, a credit card for a credit account or a debit card for a debit account. The account may enable payment using biometric authentication, or contactless based forms of authentication, such as QR codes or near-field communications. The account card may be associated or affiliated with one or more social networking sites, such as a co-branded credit card.

Kiosk system 130 may access data from third party system 150 and customer device 140. Kiosk system 130 may be electronically connected to external data storage (e.g., a cloud (not shown)) that may provide data to kiosk system 130. Data stored and/or obtained by kiosk system 130 may include customer account data, customer privacy data, and/or customer authentication data. Customer authentication data, as described above, may be calculated based on data received from each authentication attempt and/or authentication-related issue (e.g., locked account, failed authentication attempt, and the like) received kiosk system 130 (e.g., whether the issue was resolved, whether the user was authenticated, and the like). Customer authentication data may also be received from external systems (not shown), such as customer authentication rating and feedback data related to the customer authentication.

A kiosk system 130 may include modules, systems, and interfaces to send and/or receive data for use in other modules, such as communication interface 134. A communication interface 134 may include various hardware and software components, such as, for example, a repeater, a microwave antenna, a cellular tower, or another network access device capable of providing connectivity between network mediums. The communication interface 134 may also contain various software and/or hardware components to enable communication over a network 110. For example, communication interface 134 may be capable of sending or receiving signals via network 110. Moreover, communication interface 134 may provide connectivity to one or more wired networks and may be capable of receiving signals on one medium such as a wired network and transmitting the received signals on a second medium such as a wireless network.

A kiosk system 130 may include an authentication module 132 to generate and process authentication data associated with a customer. A authentication module 132 may generate authentication data based on a customer device, customer account data, customer privacy data, risk factors associated with the customer device, and/or customer authentication data. The risk factors may indicate that a user was fraudulently authenticated, and may include whether the customer device is jailbroken, whether device location services are turned on or off, GPS location, whether the phone has been lost or reported stolen to the MNO, reports of fraud or compromise from other services on the device (e.g., payment services).

Authentication data may include an alphanumeric code, a customer pattern, biometric data, a password, registered information (e.g., registered known devices), device fingerprinting, device authentication mechanisms (e.g., device PIN, device pattern login, device fingerprint or other device biometric), and the like. Customer device data include information such as service provider, device make, device model, device number, device IP address, and/or service provider plan data. Customer device data may be determined using data stored in customer account data and/or data received from a third party, such as a customer service provider. Authentication module may identify a customer device 140 using device fingerprinting (where many factors of the device are used to uniquely recognize the device), cookies, device ID (secure element ID (SEID), mobile equipment identifier (MEID), international mobile equipment identifier (IEMEI), mobile directory number (MDN), mobile identifier number (MIN), and SIM card identifier), mobile document verification. The device specific identifiers may not be accessible to third party applications, but may be available to a device manufacturer or mobile network operator's application or a third party application with access to certain private APIs that would provide this information.

As an example, authentication data may be generated to include an alphanumeric code (e.g., a four-digit code, an eight-digit code, and the like) and/or a user confirmation request. Authentication data may be generated in response to received data, such as data input on a user device and transmitted to a customer authentication device. The authentication data may be generated based on a phone number, account number, personal code (e.g., PIN and/or password), birthdate, and/or other user-input data. By way of example, authentication module 132 may receive the user-input data and generate an authentication code, such as a security token, a code generated by using a hash function, and the like. Authentication data may be generated by authentication module to expire within a predetermined amount of time, such as one minute, thirty second, and the like.

Authentication code data be generated based on geo-location data, such as a location associated with a customer device (e.g., customer device 140 or customer device 202). For example, if a customer is requesting authentication from a first device and the authentication module 132 determines that an authentication code should be transmitted to a second customer device based on data stored in data storage 136 (or from a third party), the authentication module 132 may determine a location of the first customer device and a location of the second customer device, for example when geo-location services are activated at the customer device(s). When the authentication module 132 determines that the first customer device is not within a predetermined distance (500 feet, one mile, and the like) from the second customer device, the authentication module 132 may determine than an authentication code cannot be generated.

Authentication data may be generated to be included with a notification, such as an SMS message, an MMS message, an e-mail, a push notification, a voicemail message, and the like. A notification may include data indicative of how to use the authentication code and/or data indicative of a customer authentication request. For example, where authentication data is transmitted in a push notification, the push notification may include a link to open a website, a mobile application, an authentication request notification, and/or an SMS message to input the authentication code and/or response. In the same manner, an SMS message, MMS message, e-mail, and the like may include a link to direct a customer to input the authentication data and/or authentication response for transmission to the kiosk system 130.

Authentication data may be generated without being included in a notification. For example, kiosk system 130 may transmit audio data indicative of the authentication code and/or instructions to log into an application or website to input the authentication code and/or an authentication response. The type of notification and length of code may be determined based on the customer account data, customer privacy data, and/or customer authentication system data.

A kiosk system 130 may store information in various electronic storage media, such as data storage 136. Electronic information, files, and documents may be stored in various ways, including, for example, a flat file, indexed file, hierarchical database, relational database, such as a database created and maintained with software from, for example, Oracle® Corporation, a Microsoft® SQL system, an Amazon cloud hosted database or any other query-able structured data storage mechanism.

A third party system 150 may be, for example, a customer service center and/or a company, such as a financial institution (e.g., a bank, a credit card provider, or any other entity that offers financial accounts to customer), a travel company (e.g., an airline, a car rental company, a travel agency, or the like), an insurance company, a utility company (e.g., a water, gas, electric, television, internet, or other utility provider), a manufacturing company, and/or any other type of company where a customer may be required to authenticate and account or identity. The third party system 150 may be, for example, part of the backend computing systems and associated servers of a customer service center and/or company. The third party system 150 may include a payment system, integrated with the kiosk system 130, through which a customer may complete payment, via the device kiosk 144.

A third party system may utilize and directly integrate Interactive Voice Response (IVR) systems and Automatic Call Distribution (ACD) systems to input and process a customer's response to a request when calling the third party. IVR systems, ACD systems, voice portals and other telecommunications interaction and management systems are increasingly used to provide services for customers, employees and other users. An IVR system may be able to receive and recognize a caller request and/or selection using speech recognition and/or dual-tone multi-frequency signaling (DTMF). An IVR system may receive initial caller data without requiring a response from the caller, such as a caller line identifier (CLI) from the network used by the caller to access the IVR system. Moreover, an IVR system may be able to determine a prioritization or routing of a call based on the Dialed Number Identification Service (DNIS), which determines the number dialed by the caller. An IVR system may also use a voice response unit (VRU) in order to execute either a pre-determined script or a script based on caller responses received using speech recognition or DTMF technologies. In addition, an IVR system may be implemented in a variety of settings, such as a voice caller setting, a video caller setting, and/or coordinated interactions using a telephone and a computer, such as Computer Telephony Integration (CTI) technology.

A third party system 150 may include data storage 154. A third party system 150 may include data and/or components to enable the generation, transmission, and processing of customer data. Third party system 150 may access data stored within data storage 154 and/or data stored external to a third party system 150. For example, a third party system 150 may be electronically connected to external data storage (not shown) that may provide data to a customer third party system 150. Data stored and/or obtained by a third party system 150 may include customer account data, customer privacy data, customer authentication data, and/or customer mobile device data. Customer authentication data, as described above, may be calculated based on data received from each authentication attempt and/or authentication-related issue (e.g., locked account, failed authentication attempt, and the like) received at third party system 150 (e.g., whether the issue was resolved, whether the user was authenticated, and the like). Customer authentication data may also be received from external systems (not shown), such as customer authentication rating and feedback data related to the customer authentication.

A third party system 150 may include components to send and/or receive data for use in other components, such as communication interface 152. A communication interface 152 may include various hardware and software components, such as, for example, a repeater, a microwave antenna, a cellular tower, or another network access device capable of providing connectivity between network mediums. The communication interface 152 may also contain various software and/or hardware components to enable communication over a network 110. For example, communication interface 152 may be capable of sending or receiving signals via network 110. Moreover, communication interface 152 may provide connectivity to one or more wired networks and may be capable of receiving signals on one medium such as a wired network and transmitting the received signals on a second medium such as a wireless network.

A customer device 140 may include for example, a network-enabled computer. In various example embodiments, customer device 140 may be associated with any individual or entity that desires to utilize digital authentication data in order to authenticate the customer. As referred to herein, a network-enabled computer may include, but is not limited to: e.g., any computer device, or communications device including, e.g., a server, a network appliance, a personal computer (PC), a workstation, a mobile device, a phone, a handheld PC, a personal digital assistant (PDA), a thin client, a fat client, an Internet browser, or other device. The one or more network-enabled computers of the example system 100 may execute one or more software applications to enable, for example, network communications.

Customer device 140 also may be a mobile device: For example, a mobile device may include an iPhone, iPod, iPad from Apple® or any other mobile device running Apple's iOS operating system, any device running Google's Android® operating system, including for example, Google's wearable device, Google Glass, any device running Microsoft's Windows® Mobile operating system, and/or any other smartphone or like wearable mobile device. Customer device 140 also may include a handheld PC, a phone, a smartphone, a PDA, a tablet computer, or other device. Customer device 140 may include device-to-device communication abilities, such as, for example, RFID transmitters and receivers, cameras, scanners, and/or Near Field Communication (NFC) capabilities, which may allow for communication with other devices by touching them together or bringing them into close proximity. Exemplary NFC standards include ISO/IEC 18092:2004, which defines communication modes for Near Field Communication Interface and Protocol (NFCIP-1). For example, customer device 130 may be configured using ApplePay™, Android Pay™, and/or Samsung Pay™ or the like. Other exemplary NFC standards include those created by the NFC Forum.

Customer device 140 may include one or more software applications, such a mobile application, device kiosk 144, associated with kiosk system 130. For example, a kiosk software application may be a preloaded application on a mobile device, or extensions of an existing application that could be used by third party system 150 to deliver call center experiences. Customer device 140 may include a display which may display software, including software applications, such as a kiosk application, executing on the customer device 140.

Customer device 140 may include components to send and/or receive data for use in other components, such as communication interface 142. A communication interface 142 may include various hardware and software components, such as, for example, a repeater, a microwave antenna, a cellular tower, or another network access device capable of providing connectivity between network mediums. The communication interface 142 may also contain various software and/or hardware components to enable communication over a network 110. For example, communication interface 142 may be capable of sending or receiving signals via network 110. Moreover, communication interface 142 may provide connectivity to one or more wired networks and may be capable of receiving signals on one medium such as a wired network and transmitting the received signals on a second medium such as a wireless network. One or more customers may access network 110 through one or more customer devices 140 that also may be communicatively coupled to network 110.

Customer device 140 may include data storage 146 to store information in various electronic storage media. Electronic information, files, and documents may be stored in various ways, including, for example, a flat file, indexed file, hierarchical database, relational database, such as a database created and maintained with software from, for example, Oracle® Corporation, a Microsoft® SQL system, an Amazon cloud hosted database or any other query-able structured data storage mechanism.

Figure 2:
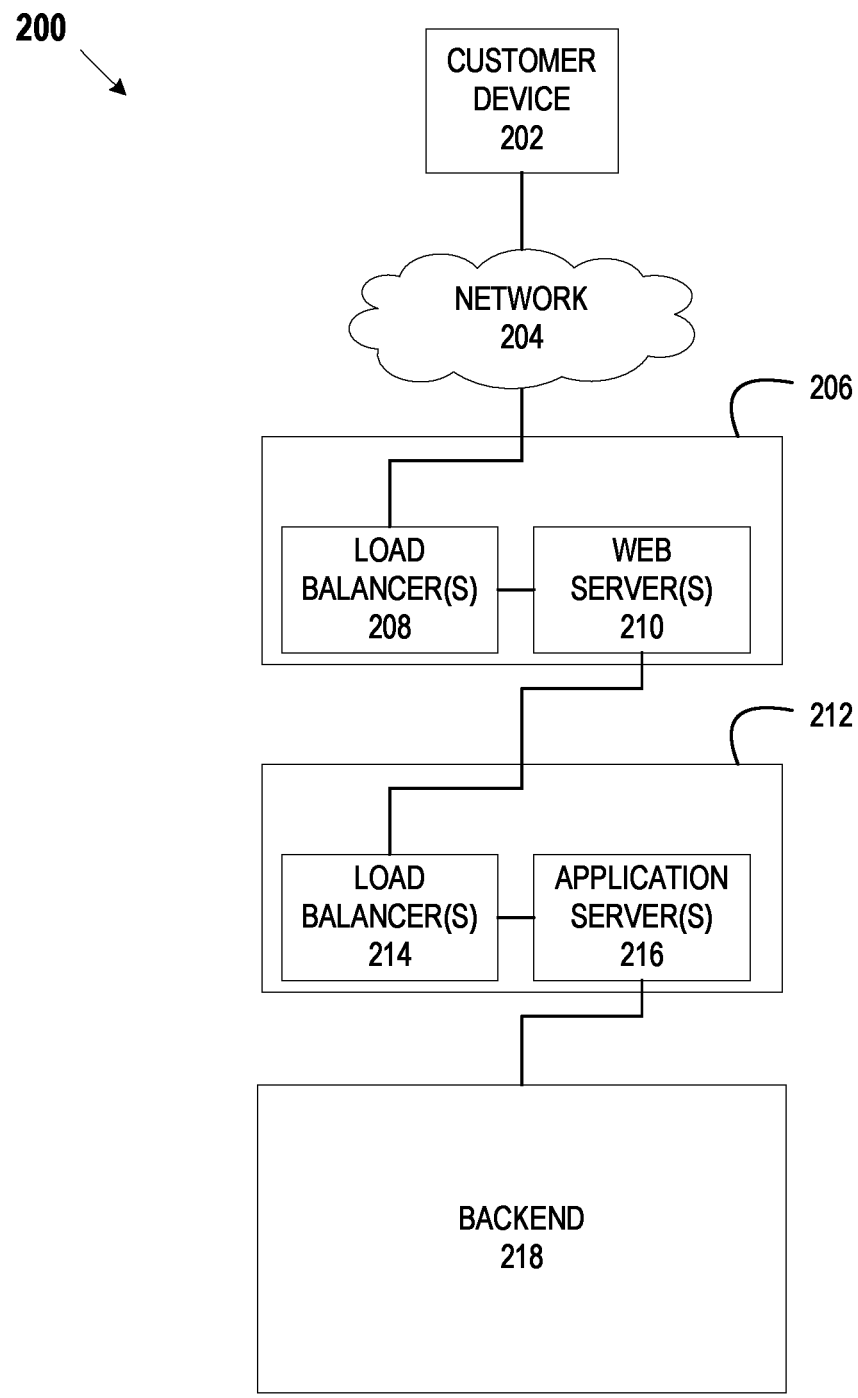
FIG. 2 depicts a schematic diagram of an example customer service center for use in a system for delivering customer service via a device kiosk, according to an example embodiment of the disclosure.

Referring to FIG. 2, which depicts an example system 200 that may enable a system, such as a third party call center system 150, for example, to provide network services to its customers. As shown in FIG. 2, system 200 may include a customer device 202, a network 204, a front-end controlled domain 206, a back-end controlled domain 212, and a backend 218. Front-end controlled domain 206 may include one or more load balancers 208 and one or more web servers 210. Back-end controlled domain 212 may include one or more load balancers 214 and one or more application servers 216.

Customer device 202 may be a network-enabled computer, similar to customer device 140. As referred to herein, a network-enabled computer may include, but is not limited to: e.g., any computer device, or communications device including, e.g., a server, a network appliance, a personal computer (PC), a workstation, a mobile device, a phone, a handheld PC, a personal digital assistant (PDA), a thin client, a fat client, an Internet browser, or other device. The one or more network-enabled computers of the example system 200 may execute one or more software applications to enable, for example, network communications.

Customer device 202 also may be a mobile device: For example, a mobile device may include an iPhone, iPod, iPad from Apple® or any other mobile device running Apple's iOS operating system, any device running Google's Android® operating system, including for example, Google's wearable device, Google Glass, any device running Microsoft's Windows® Mobile operating system, and/or any other smartphone or like wearable mobile device.

Network 204 may be one or more of a wireless network, a wired network, or any combination of a wireless network and a wired network. For example, network 204 may include one or more of a fiber optics network, a passive optical network, a cable network, an Internet network, a satellite network, a wireless LAN, a Global System for Mobile Communication (GSM), a Personal Communication Service (PCS), a Personal Area Networks, (PAN), D-AMPS, Wi-Fi, Fixed Wireless Data, IEEE 802.11b, 802.15.1, 802.11n, and 802.11g or any other wired or wireless network for transmitting and receiving a data signal.

In addition, network 204 may include, without limitation, telephone lines, fiber optics, IEEE Ethernet 902.3, a wide area network (WAN), a local area network (LAN) or a global network such as the Internet. Also, network 204 may support an Internet network, a wireless communication network, a cellular network, or the like, or any combination thereof. Network 204 may include one network, or any number of example types of networks mentioned above, operating as a stand-alone network or in cooperation with each other. Network 204 may utilize one or more protocols of one or more network elements to which they are communicatively couples. Network 204 may translate to or from other protocols to one or more protocols of network devices. Although network 204 is depicted as a single network, it should be appreciated that according to one or more embodiments, network 204 may comprise a plurality of interconnected networks, such as, for example, the Internet, a service provider's network, a cable television network, corporate networks, and home networks.

Front-end controlled domain 206 may be implemented to provide security for backend 218. Load balancer(s) 208 may distribute workloads across multiple computing resources, such as, for example computers, a computer cluster, network links, central processing units or disk drives. In various embodiments, load balancer(s) 208 may distribute workloads across, for example, web server(s) 210 and/or backend 218 systems. Load balancing aims to optimize resource use, maximize throughput, minimize response time, and avoid overload of any one of the resources. Using multiple components with load balancing instead of a single component may increase reliability through redundancy. Load balancing is usually provided by dedicated software or hardware, such as a multilayer switch or a Domain Name System (DNS) server process.

Load balancer(s) 208 may include software that monitoring the port where external clients, such as, for example, customer device 202, connect to access various services of a call center, for example. Load balancer(s) 208 may forward requests to one of the application servers 216 and/or backend 218 servers, which may then reply to load balancer 208. This may allow load balancer(s) 208 to reply to customer device 202 without customer device 202 ever knowing about the internal separation of functions. It also may prevent customer devices from contacting backend servers directly, which may have security benefits by hiding the structure of the internal network and preventing attacks on backend 218 or unrelated services running on other ports, for example.

A variety of scheduling algorithms may be used by load balancer(s) 208 to determine which backend server to send a request to. Simple algorithms may include, for example, random choice or round robin. Load balancers 208 also may account for additional factors, such as a server's reported load, recent response times, up/down status (determined by a monitoring poll of some kind), number of active connections, geographic location, capabilities, or how much traffic it has recently been assigned.

Load balancers 208 may be implemented in hardware and/or software. Load balancer(s) 208 may implement numerous features, including, without limitation: asymmetric loading; Priority activation: SSL Offload and Acceleration; Distributed Denial of Service (DDoS) attack protection; HTTP compression; TCP offloading; TCP buffering; direct server return; health checking; HTTP caching; content filtering; HTTP security; priority queuing; rate shaping; content-aware switching; client authentication; programmatic traffic manipulation; firewall; intrusion prevention systems.

Web server(s) 210 may include hardware (e.g., one or more computers) and/or software (e.g., one or more applications) that deliver web content that can be accessed by, for example a client device (e.g., customer device 202) through a network (e.g., network 204), such as the Internet. In various examples, web servers, may deliver web pages, relating to, for example, online banking applications and the like, to clients (e.g., caller device 202). Web server(s) 210 may use, for example, a hypertext transfer protocol (HTTP or sHTTP) to communicate with customer device 202. The web pages delivered to client device may include, for example, HTML documents, which may include images, style sheets and scripts in addition to text content.

A user agent, such as, for example, a web browser, web crawler, or native mobile application, may initiate communication by making a request for a specific resource using HTTP and web server 210 may respond with the content of that resource or an error message if unable to do so. The resource may be, for example a file on stored on backend 218. Web server(s) 210 also may enable or facilitate receiving content from customer device 202 so customer device 202 may be able to, for example, submit web forms, including uploading of files.

Web server(s) also may support server-side scripting using, for example, Active Server Pages (ASP), PHP, or other scripting languages. Accordingly, the behavior of web server(s) 210 can be scripted in separate files, while the actual server software remains unchanged.

Load balancers 214 may be similar to load balancers 208 as described above.

Application server(s) 216 may include hardware and/or software that is dedicated to the efficient execution of procedures (e.g., programs, routines, scripts) for supporting its applied applications. Application server(s) 216 may comprise one or more application server frameworks, including, for example, Java application servers (e.g., Java platform, Enterprise Edition (Java EE), the .NET framework from Microsoft®, PHP application servers, and the like). The various application server frameworks may contain a comprehensive service layer model. Also, application server(s) 216 may act as a set of components accessible to, for example, a call center, system supported by a call center, or other entity implementing system 200, through an API defined by the platform itself. For Web applications, these components may be performed in, for example, the same running environment as web server(s) 210, and application servers 216 may support the construction of dynamic pages. Application server(s) 216 also may implement services, such as, for example, clustering, fail-over, and load-balancing. In various embodiments, where application server(s) 216 are Java application servers, the web server(s) 216 may behaves like an extended virtual machine for running applications, transparently handling connections to databases associated with backend 218 on one side, and, connections to the Web client (e.g., customer device 202) on the other.

Backend 218 may include hardware and/or software that enables the backend services of, for example, a customer authentication system or other entity that maintains a distributed system similar to system 200. For example, backend 218 may include a system of customer authentication records, mobile applications, online platforms, and the like. In the example where a backend 218 is associated with a financial institution, backend 218 may include a system of record, online banking applications, a rewards platform, a payments platform, a lending platform, including the various services associated with, for example, auto and home lending platforms, a statement processing platform, one or more platforms that provide mobile services, one or more platforms that provide online services, a card provisioning platform, a general ledger system, and the like. Backend 218 may be associated with various databases, including account databases that maintain, for example, customer account data, customer privacy data, and or customer authentication data. Additional databases may maintain customer account information, product databases that maintain information about products and services available to customers, content databases that store content associated with, for example, a financial institution, and the like. Backend 218 also may be associated with one or more servers that enable the various services provided by system 200.

Figure 3:
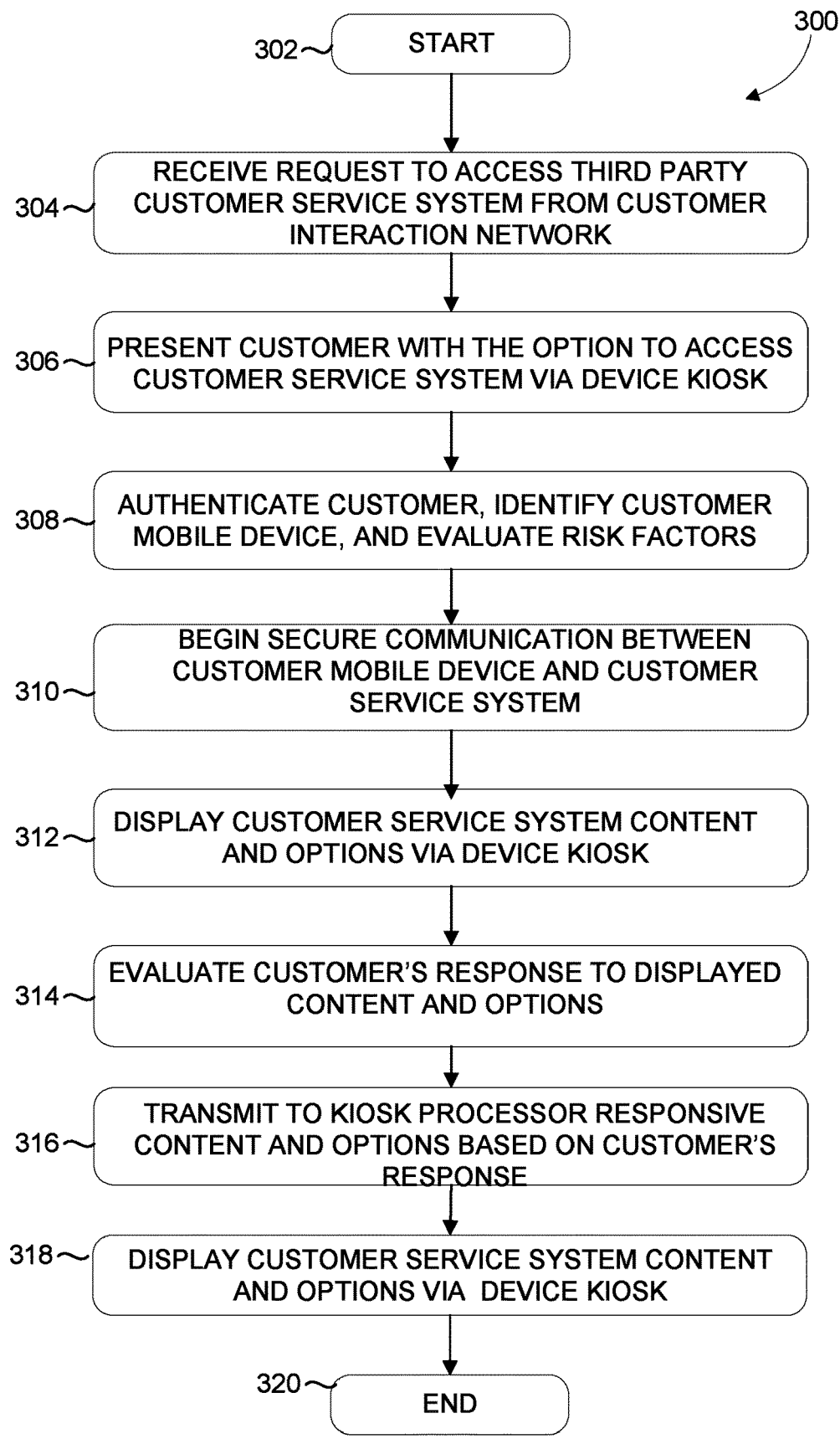
FIG. 3 depicts a flowchart illustrating an example method for delivering customer service via a device kiosk on a customer's mobile device, according to an example embodiment of the disclosure.

FIG. 3 depicts a flowchart illustrating an example method for delivering customer service via a device kiosk on a customer's mobile device, according to an example embodiment. The method 300 illustrated in FIG. 3 is described using a third party customer service system, a kiosk processor, and a customer interaction channel. One of ordinary skill in the art will understand that similar techniques for delivering third party customer service systems could be utilized in various other customer interaction channels referenced herein.

The method 300 may begin at block 302. At block 304, a third party system may receive customer data from a customer interaction network associated with an incoming call or website generated request. The third party system may receive the customer data via an IVR system and/or by a customer service representative. Customer data may include initial caller data such as a CLI from the network used by the customer to access the third party customer service system. Customer data may also include a DNIS, which may be used to initially route the call or request. The CLI and DNIS may be used to look up customer data associated with an authentication request from a customer device. For example, the customer and third party system may initiate a database inquiry using the CLI and DNIS to an account database to determine if a customer can be identified using the CLI and/or DNIS. In such an example, if the CLI and/or DNIS is associated with a data field associated with a particular customer, the database could return identification information about the customer and the customer data. A third party customer service system may, in response to receiving customer data from the network associated with an incoming call, generate and transmit scripted data using a VRU to a customer device, where the scripted data may request information from the customer via the customer device. For example, scripted data may include a request to enter a phone number, account number, or other data using a keypad and/or touchscreen associated with customer device. Scripted data may include a request for a customer to select whether the customer would like to proceed with the third party customer service authentication.

A customer mobile device may receive an option to access the customer service system via a device kiosk on the customer's mobile device, block 306. When a customer transmits a response, the third party customer service system may trigger a silent push notification, via a push notification gateway, to a kiosk processor. A response may include speech and/or input via a keypad or touchscreen. The push notification may include an embedded deep link in the payload to the third party customer service system. At block 308, the kiosk processor may determine authentication data based on the customer data and/or input, customer device data and risk factors associated with the customer device received at block 304. The kiosk processor may utilize this authentication data to authenticate the customer, identify the customer mobile device and evaluate risk factors associated with the customer mobile device.

The kiosk processor may transmit, via a communication interface associated with the kiosk processor, the push notification to the customer mobile device. When the push notification is received by the customer mobile device, the device kiosk on the customer mobile device may be opened, and a secure connection between the customer mobile device and the third party customer service system may be established, via the network (block 310). The customer may be asked by the device kiosk if the customer wants to connect to the given third party system. The customer may be given option to connect, not connect, or refuse or block all connections from this third party.

If a push notification is not transmitted to a customer mobile device, the kiosk processor needs to identify what third party is being requested when the customer opens the device kiosk on the customer mobile device. The kiosk processor may identify what third party is being requested by matching an outbound call made by the customer to a third party via a lookup table or database. The kiosk processor may then make a call to the third party customer service system requesting customer content and options to be displayed, via a user interface, by the device kiosk.

The device kiosk may use the transmitted deep link to make a call to the kiosk processor for data to present to the customer. The device kiosk may also make a call directly to the third party customer service system after the secure connection between the customer mobile device and the third party customer service system is established. At block 312, the device kiosk may display customer service system content and options from the third party system, via a user interface on the customer mobile device.

The kiosk processor may be connected to a content management system (CMS) or content delivery network (CDN) that third parties may use to deliver their content which may include video, imagery, an other types of downloadable files. Data may be temporarily or permanently stored on the CMS and CDN. The kiosk processor and component may present content using a series of templates. The template may be specified in an API request from the third party system to the kiosk processor, and could reduce the amount of data sent, thereby increasing the speed of the device kiosk and overall interaction. The template may be configurable to maintain the branding of the third party, and may be stored on the kiosk processor, component, or a combination of both.

The customer may respond to the displayed customer service system content and options by entering data or making a selection. A response may include speech and/or input via a keypad or touchscreen. The device kiosk may transmit the customer's responsive data to the kiosk processor, which may transmit the customer's response to the third party customer service system. At block 314, the third party customer service system may evaluate the customer's response to the displayed content and options. At block 316, the third party customer service system may transmit responsive content and options based on the customer's response to the kiosk processor. At block 318, the device kiosk may display, via a user interface, the responsive third party system content and options. The method may end at block 320.

Figure 4:
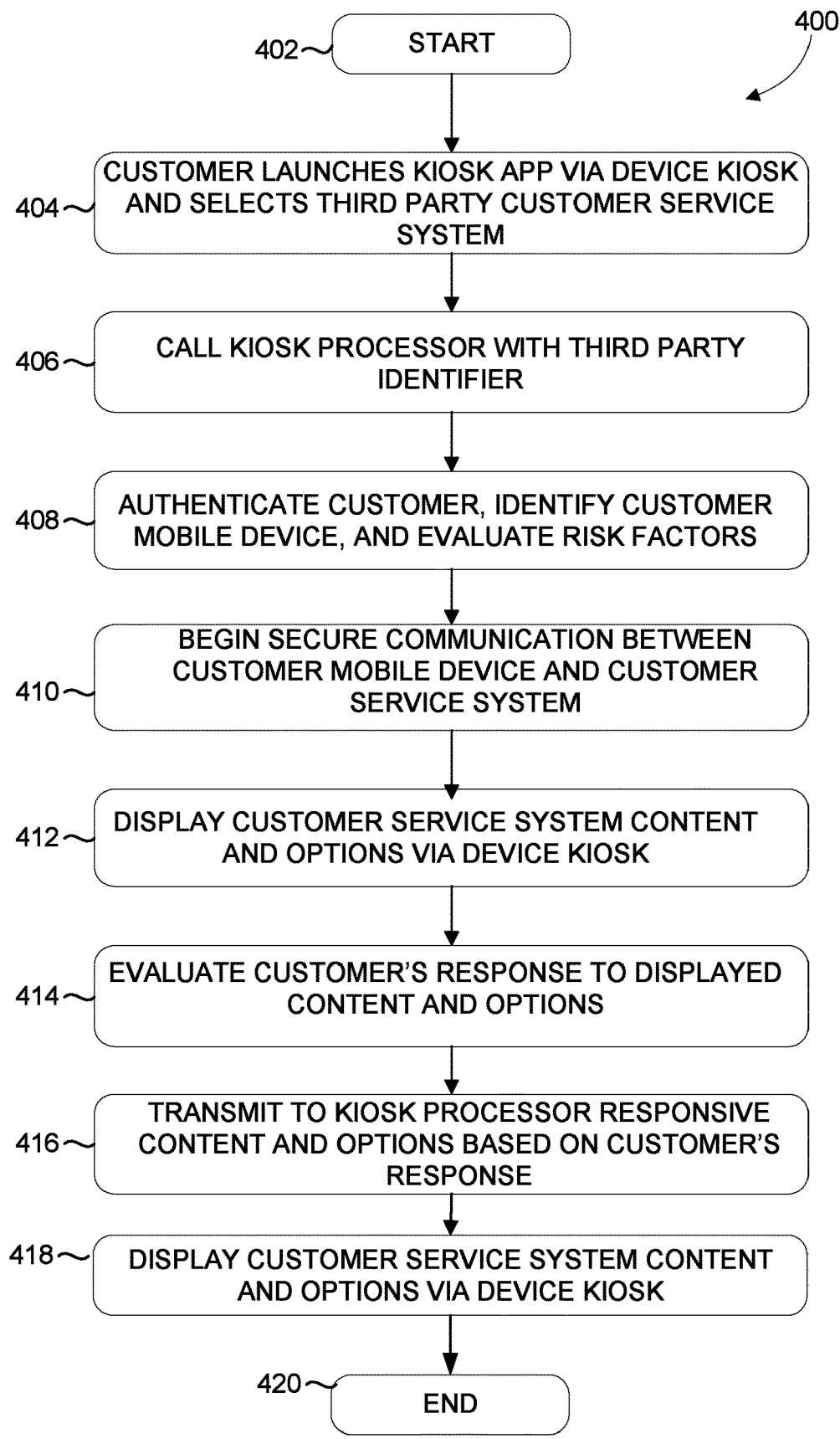
FIG. 4 illustrates a flowchart illustrating an example method for delivering customer service via a device kiosk on a customer's mobile device for a customer launching the kiosk application directly from a customer mobile device.

FIG. 4 illustrates a flowchart illustrating an example method for delivering customer service via a device kiosk on a customer's mobile device for a customer launching the kiosk application directly from the customer mobile device, according to an example embodiment.

The method 400 illustrated in FIG. 4 is described using a third party customer service system, a kiosk processor, and a customer interaction channel. One of ordinary skill in the art will understand that similar techniques for delivering third party customer service systems could be utilized in various other customer interaction channels referenced herein.

The method 400 may begin at block 402. At block 404, a customer may launch a kiosk application, via a device kiosk on the customer's mobile device. The customer may select a third party from a recently used list, bookmarked list, saved list, list of nearby merchants, directory, search results, etc. At block 406, the device kiosk may call the kiosk processor with a third party identifier of the selected third party.

At block 408, the kiosk processor may determine authentication data based on the customer data and/or input, customer device data and risk factors associated with the customer device received at block 404. The kiosk processor may utilize this authentication data to authenticate the customer, identify the customer mobile device and evaluate risk factors associated with the customer mobile device. At block 410, the kiosk system may establish a secure connection between the customer mobile device and the third party customer service system, via the network.

The device kiosk may use a transmitted deep link to make a call to the kiosk processor for data to present to the customer. At block 412, the device kiosk may display customer service system content and options from the third party system, via a user interface on the customer mobile device. The customer may respond to the displayed customer service system content and options by entering data or making a selection. A response may include speech and/or input via a keypad or touchscreen. The device kiosk may transmit the customer's responsive data to the kiosk processor, which may transmit the customer's response to the third party customer service system. At block 414, the third party customer service system may evaluate the customer's response to the displayed content and options. At block 416, the third party customer service system may transmit responsive content and options based on the customer's response to the kiosk processor. At block 418, the device kiosk may display, via a user interface, the responsive third party system content and options. The device kiosk may provide the ability to call and/or online chat with specific third party system agents, and may provide the ability for a third party system agent to leave a message for the customer. A third party agent may push a link to the device kiosk, that may be saved for a customer to access. The method may end at block 420.

Figure 5:
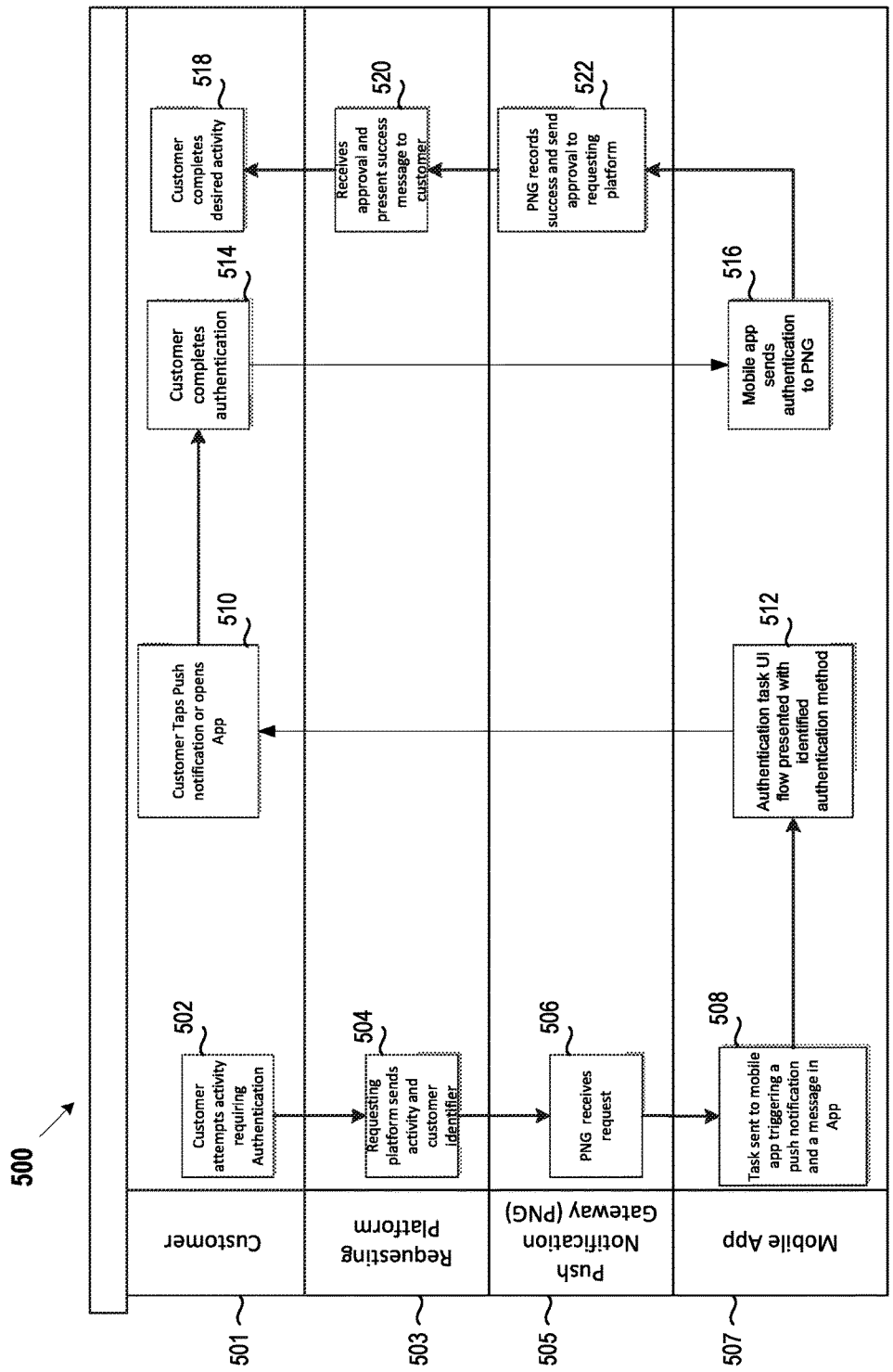
FIG. 5 depicts a flowchart illustrating an example method for push authentication, according to an example embodiment of the disclosure

FIG. 5 depicts a swim lane diagram illustrating an example method 500 for push authentication, according to an example embodiment of the disclosure. In various embodiments, a customer 501 may desire to perform a transaction within a particular channel. A requesting platform 503 associated with that channel may request to use push authentication to authorize the transaction. For example, a customer may call into a call center and wish to pay a credit card balance. A requesting platform associated with the call center channel may interact with a push notification gateway 505 to authorize the customer to allow the customer to perform the balance transfer. The push notification gateway 505 may and interact with a mobile application 507 on a customer device to authenticate the customer using push notification authentication.

Method 500 may begin when a customer 501 attempts an activity requiring authentication in block 502. The example where a customer calls into a call center to pay a credit card balance is used to illustrate method 500. In various embodiments, other activities requiring authentication and other customer interaction channels may be used. For example, a customer may request a balance transfer using a mobile application channel and the like.

In block 504, a requesting platform 503 transmits the activity and customer identifier to a push notification gateway 505. To do so, the requesting platform 503 may establish a secure connection with the push notification gateway 505 to allow the requesting platform 503 to communicate securely with the push notification gateway 505. In various embodiments, the requesting platform 503 may establish, for example, a secure socket layer (SSL) or similar secure connection with the push notification gateway 505. Once the secure connection is established, the requesting platform 503 may transmit, for example, a data packet containing data indicative of the activity and the customer identifier to the push notification gateway 505 via the secure connection.

In block 506, the push notification gateway 505 receives the request from the requesting platform 503. For example, the push notification gateway 505 may receive a data packet containing data indicative of the activity and the customer identifier via the secure connection at a communications interface.

In block 512, the mobile application 507 on the customer device may receive a push notification from push notification gateway 505, for example, which may result in an in-application message to the customer 501 that a certain activity is being attempted which requires authentication via the mobile application. For example, the customer 501 may receive a push notification via its mobile device, which when customer 501 interacts with the push notification, the mobile device interfaces the push notification with mobile application 507 to begin the authentication process.

In block 510, the customer 501 interacts with the push notification by, for example, tapping or touching on the push notification to open the mobile application 507. In various embodiments, an application programming interface and/or additional software executing on the mobile device may execute instructions to cause the mobile application 507 to open and begin the authentication process. In block 514, customer 501 may complete the authentication using, for example mobile application 507.

In block 516, mobile application 507 may transmit authentication information via a secure connection to push notification gateway 505. For example, mobile application 507 may transmit one or more data packets containing the authentication information over a network via a secure connection. In various embodiments, the secured connections described herein may contemplate using various encryption techniques to secure the transmitted information.

In block 522, the push notification gateway 505 may determine whether the authentication information can be verified. To do so, push notification gateway 505 may compare the received authentication information to known authentication information to determine whether the received information matches the known information. If the authentication information is verified, the push notification gateway 505 may transmit an approval to the requesting platform 503 to authenticate the requested activity. This approval may be transmitted from the push notification gateway 505 to the requesting platform 503 via a network using a secure connection.

In block 520, the requesting platform 503 receives the approval and presents a success message to the customer 501.

In block 518, the customer is authorized to complete the requested/desired activity using, for example, the customer interaction channel.

The present disclosure is not to be limited in terms of the particular embodiments described in this application, which are intended as illustrations of various aspects. Many modifications and variations can be made without departing from its spirit and scope, as may be apparent. Functionally equivalent methods and apparatuses within the scope of the disclosure, in addition to those enumerated herein, may be apparent from the foregoing representative descriptions. Such modifications and variations are intended to fall within the scope of the appended representative claims. The present disclosure is to be limited only by the terms of the appended representative claims, along with the full scope of equivalents to which such representative claims are entitled. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It may be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It may be further understood by those within the art that if a specific number of an introduced claim recitation is intended, such an intent may be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It may be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" may be understood to include the possibilities of "A" or "B" or "A and B."

The foregoing description, along with its associated embodiments, has been presented for purposes of illustration only. It is not exhaustive and does not limit the invention to the precise form disclosed. Those skilled in the art may appreciate from the foregoing description that modifications and variations are possible in light of the above teachings or may be acquired from practicing the disclosed embodiments. For example, the steps described need not be performed in the same sequence discussed or with the same degree of separation. Likewise various steps may be omitted, repeated, or combined, as necessary, to achieve the same or similar objectives. Accordingly, the invention is not limited to the above-described embodiments, but instead is defined by the appended claims in light of their full scope of equivalents.

In the preceding specification, various preferred embodiments have been described with references to the accompanying drawings. It may, however, be evident that various modifications and changes may be made thereto, and additional embodiments may be implemented, without departing from the broader scope of the invention as set forth in the claims that follow. The specification and drawings are accordingly to be regarded as an illustrative rather than restrictive sense.

We claim:
1. A system, comprising:
a customer service authentication processor;
a customer interaction channel that receives, via an associated customer interaction network, a request to access a third party customer service provider system, via a device customer service application on a customer mobile device;
an authentication processor connected to the customer service application processor that receives customer data and customer input associated with an authentication request, sent from the customer mobile device via the network, to authenticate a customer, identifies a customer mobile device based on device identifiers, and evaluates risk factors associated with the customer mobile device, wherein the risk factors comprise whether the customer mobile device is jailbroken; and a communication interface associated with the customer service authentication processor, that transmits, via a push notification gateway, a push notification to the device customer service application on the customer mobile device that establishes, via the network, a secure connection between the customer mobile device and the third party customer service provider system, wherein:

the device customer service application displays via a user interface on the customer mobile device, content and options for the customer from the third party customer service provider system;

the third party customer service provider system evaluates the customer's response to the displayed content and options, and transmits to the customer mobile device responsive content and options based on the customer's response; and the device customer service application displays via a user interface the responsive third party customer service provider system content and options.

2. The system of claim 1, wherein the customer service authentication processor is a kiosk processor.

3. The system of claim 2, wherein the device customer service application is a device kiosk.

4. The system of claim 1, wherein the risk factors further comprise whether device location services are active on the customer mobile device, whether the customer mobile device has been reported lost or reported stolen, or reports of fraud or compromise from other services on the customer mobile device, or some combination thereof.

5. The system of claim 1, wherein the push notification includes an embedded deep link that identifies the third party customer service provider system in a payload of the push notification.

6. The system of claim 1, wherein the customer data is derived from caller line identifier data.

7. The system of claim 1, wherein the customer input is inputted into the customer mobile device.

8. A computer-implemented method, comprising:

receiving from a customer, via a customer interaction channel associated with a customer interaction network, a request to access a third party customer service provider system, via a device customer service application on a customer mobile device;

authenticating the customer, using an authentication processor associated with a customer service authentication processor, based on customer data and customer input associated with an authentication request received via the network;

identifying the customer mobile device, using the authentication processor, based on device identifiers;

evaluating risk factors associated with the customer mobile device, using the authentication processor, wherein the risk factors comprise whether the customer mobile device is jailbroken;

transmitting, via a push notification gateway, using a communication interface associated with the customer service authentication processor, a push notification to the device customer service application on the customer mobile device that establishes, via the network, a secure connection between the customer mobile device and the third party customer service provider system;

displaying, via a user interface, content and options for the customer from the third party customer service provider system, using the device kiosk;

evaluating, using the third party customer service provider system, the customer's response to the displayed content and options;

transmitting, to the customer service authentication processor, responsive content and options based on the customer's response; and displaying, via a user interface, the responsive third party customer service provider system content and options.

9. The method of claim 8, wherein the customer service authentication processor is a kiosk processor.

10. The method of claim 9, wherein the device customer service application is a device kiosk.

11. The system of claim 8, wherein the risk factors further comprise whether device location services are active on the customer mobile device, whether the customer mobile device has been reported lost or reported stolen, or reports of fraud or compromise from other services on the customer mobile device, or some combination thereof.

12. The method of claim 8, wherein the push notification includes an embedded deep link that identifies the third party customer service provider system in a payload of the push notification.

13. The method of claim 8, wherein the customer data is derived from caller line identifier data.

14. The method of claim 8, wherein the customer input is inputted into the customer mobile device.

* * * * *